US008625061B2

United States Patent
Oh et al.

(10) Patent No.: US 8,625,061 B2
(45) Date of Patent: Jan. 7, 2014

(54) DISPLAY SUBSTRATE, METHOD OF MANUFACTURING THE DISPLAY SUBSTRATE AND LIQUID CRYSTAL DISPLAY DEVICE HAVING THE DISPLAY SUBSTRATE

(75) Inventors: Keun-Chan Oh, Cheonan-si (KR); Joo-Seok Yeom, Gwacheon-si (KR); Youn-Hak Jeong, Cheonan-si (KR); Hee-Hwan Lee, Busan (KR); Jae-Jin Lyu, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 988 days.

(21) Appl. No.: 12/613,234

(22) Filed: Nov. 5, 2009

(65) Prior Publication Data

US 2010/0328591 A1 Dec. 30, 2010

(30) Foreign Application Priority Data

Jun. 30, 2009 (KR) .............................. 2009-0059187

(51) Int. Cl.
G02F 1/1343 (2006.01)
G02F 1/1335 (2006.01)
G02F 1/1368 (2006.01)

(52) U.S. Cl.
USPC ............... 349/114; 349/48; 349/96; 349/112; 349/138; 349/141; 349/187

(58) Field of Classification Search
USPC ............ 349/48, 96, 112, 113, 114, 122, 139, 349/141, 187; 345/92; 257/59, 72; 438/30
See application file for complete search history.

(56) References Cited

U.S. PATENT DOCUMENTS

| 2003/0011870 | A1* | 1/2003 | Otake et al. ................... 359/315 |
| 2003/0063244 | A1* | 4/2003 | Fujimori et al. .............. 349/113 |
| 2006/0146248 | A1* | 7/2006 | Park .............................. 349/141 |
| 2008/0100764 | A1* | 5/2008 | Haruyama ....................... 349/43 |
| 2009/0167998 | A1* | 7/2009 | Park et al. ..................... 349/114 |
| 2009/0201449 | A1* | 8/2009 | Nishida ......................... 349/114 |
| 2010/0053488 | A1* | 3/2010 | Kim et al. ....................... 349/48 |
| 2010/0208184 | A1* | 8/2010 | Shin et al. ..................... 349/139 |

FOREIGN PATENT DOCUMENTS

WO WO 2008/001507 * 1/2008

* cited by examiner

*Primary Examiner* — Dung Nguyen
*Assistant Examiner* — Tai Duong
(74) *Attorney, Agent, or Firm* — H.C. Park & Associates, PLC

(57) ABSTRACT

A display substrate includes a base substrate, a reflective layer, a common electrode and a pixel electrode. The base substrate includes a pixel area having a transmissive area and a reflective area. The reflective layer is disposed in the reflective area of the base substrate. The common electrode includes a first sub-common electrode formed in the reflective area and a second sub-common electrode formed in the transmissive area. The pixel electrode includes a first sub-pixel electrode spaced apart from the first sub-common electrode by a first distance in the reflective area, and a second sub-pixel electrode spaced apart from the second sub-common electrode by a second distance less than the first distance in the transmissive area.

20 Claims, 12 Drawing Sheets

DISPLAY SUBSTRATE, METHOD OF MANUFACTURING THE DISPLAY SUBSTRATE AND LIQUID CRYSTAL DISPLAY DEVICE HAVING THE DISPLAY SUBSTRATE

CROSS REFERENCE TO RELATED APPLICATION

This application claims priority from and the benefit of Korean Patent Application No. 2009-59187, filed on Jun. 30, 2009, which is hereby incorporated by reference for all purposes as if fully set forth herein.

BACKGROUND OF THE INVENTION

1. Field of the Invention

Exemplary embodiments of the present invention relate to a display substrate, a method of manufacturing the display substrate and a liquid crystal display (LCD) device having the display substrate. More particularly, exemplary embodiments of the present invention relate to a display substrate having an enhanced viewing angle and capable of reducing power consumption, a method of manufacturing the display substrate and an LCD device having the display substrate.

2. Discussion of the Background

Generally, a liquid crystal display (LCD) device may be classified into a transmissive-type LCD device, a reflective-type LCD device, a transflective-type LCD device, etc. Since the transmissive-type LCD device has high visibility and high color reproducibility in an indoor space, the transmissive-type LCD device has been widely used. However, the visibility of the transmissive-type LCD device is decreased outdoors, and power consumption of the transmissive-type LCD device is high.

On the other hand, the reflective-type LCD device has high visibility outdoors and does not employ an internal light source, for example, a backlight, so that the reflective-type LCD has a merit of low power consumption. However, the visibility of the reflective-type LCD device is decreased in a dark environment, such as an indoor space.

Thus, a transflective-type LCD device has been developed, which has merits of the transmissive-type LCD and the reflective-type LCD device. That is, there is one light path passing through a liquid crystal layer in a transmissive area; however, incident light is reflected against a reflective plate to the liquid crystal layer so that the number of light paths passing the liquid crystal layer is two. Thus, a difference of phase delay exists in the two areas. In order to solve the problems associated with the phase delay, the transflective-type LCD is designed so that a cell gap of a liquid crystal layer in the transmissive area is twice as large as that of a cell gap of a liquid crystal layer in the reflective area.

However, when such a multi-cell gap method is employed in a large-scale display panel, defects caused by dust or poor control of the director may occur in the large-scale display panel. Moreover, since the large-scale display panel uses a small number of cells, defects of one cell may cause a large problem during operation of the large-scale display panel.

SUMMARY OF THE INVENTION

Exemplary embodiments of the present invention provide a display substrate having an enhanced viewing angle and capable of reducing power consumption.

Exemplary embodiments of the present invention also provide a method of manufacturing the above-mentioned display substrate.

Exemplary embodiments of the present invention also provide a liquid crystal display (LCD) having the above-mentioned display substrate.

Additional features of the invention will be set forth in the description which follows, and in part will be apparent from the description, or may be learned by practice of the invention.

An exemplary embodiment of the present invention discloses a display substrate including a base substrate, a reflective layer, a common electrode and a pixel electrode. The base substrate includes a pixel area having a transmissive area and a reflective area. The reflective layer is disposed in the reflective area of the base substrate. The common electrode includes a first sub-common electrode formed in the reflective area and a second sub-common electrode formed in the transmissive area. The pixel electrode includes a first sub-pixel electrode spaced apart from the first sub-common electrode by a first distance in the reflective area, and a second sub-pixel electrode spaced apart from the second sub-common electrode by a second distance substantially smaller than the first distance in the transmissive area.

An exemplary embodiment of the present invention also discloses a method of manufacturing a display substrate as follows. A reflective layer is formed in a base substrate comprising a pixel area having a transmissive area and a reflective area, in correspondence with the reflective area. A first sub-pixel electrode is formed in the reflective area, and a second sub-pixel electrode is formed in the transmissive area. A first sub-common electrode spaced apart from the first sub-pixel electrode by a first distance is formed in the reflective area, and a second sub-common electrode spaced apart from the second sub-pixel electrode by a second distance that is smaller than the first distance is formed in the transmissive area.

An exemplary embodiment of the present invention also discloses an LCD device including a display substrate, an opposite substrate and a liquid crystal layer. The display substrate includes a base substrate, a reflective layer, a common electrode and a pixel electrode. The base substrate includes a pixel area having a transmissive area and a reflective area. The reflective layer is disposed in the reflective area of the base substrate. The common electrode includes a first sub-common electrode formed in the reflective area and a second sub-common electrode formed in the transmissive area. The pixel electrode includes a first sub-pixel electrode spaced apart from the first sub-common electrode by a first distance in the reflective area, and a second sub-pixel electrode spaced apart from the second sub-common electrode by a second distance smaller than the first distance in the transmissive area. The opposite substrate faces the display substrate. The liquid crystal layer is disposed between the opposite substrate and the display substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
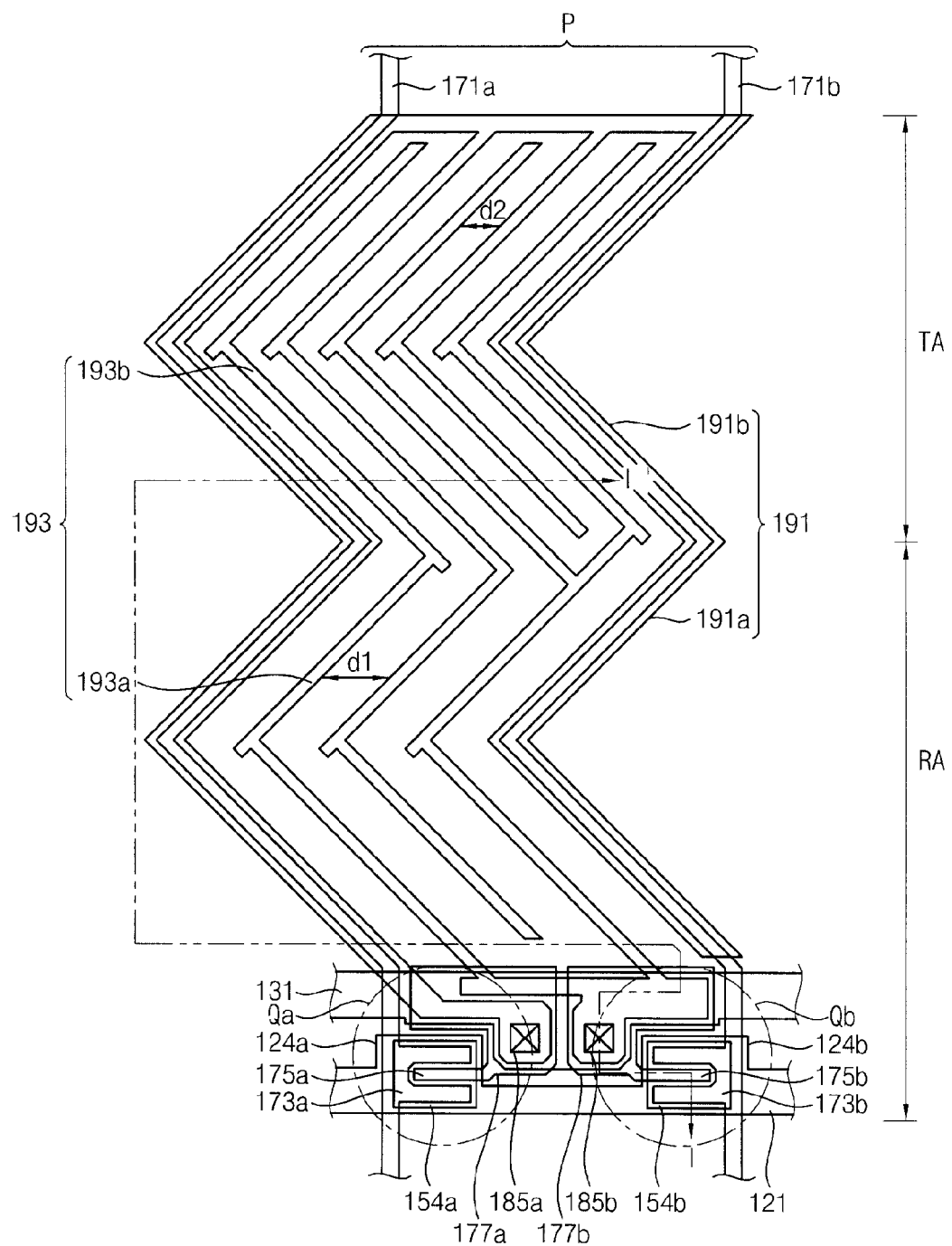
FIG. 1 is a plan view illustrating a display panel according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
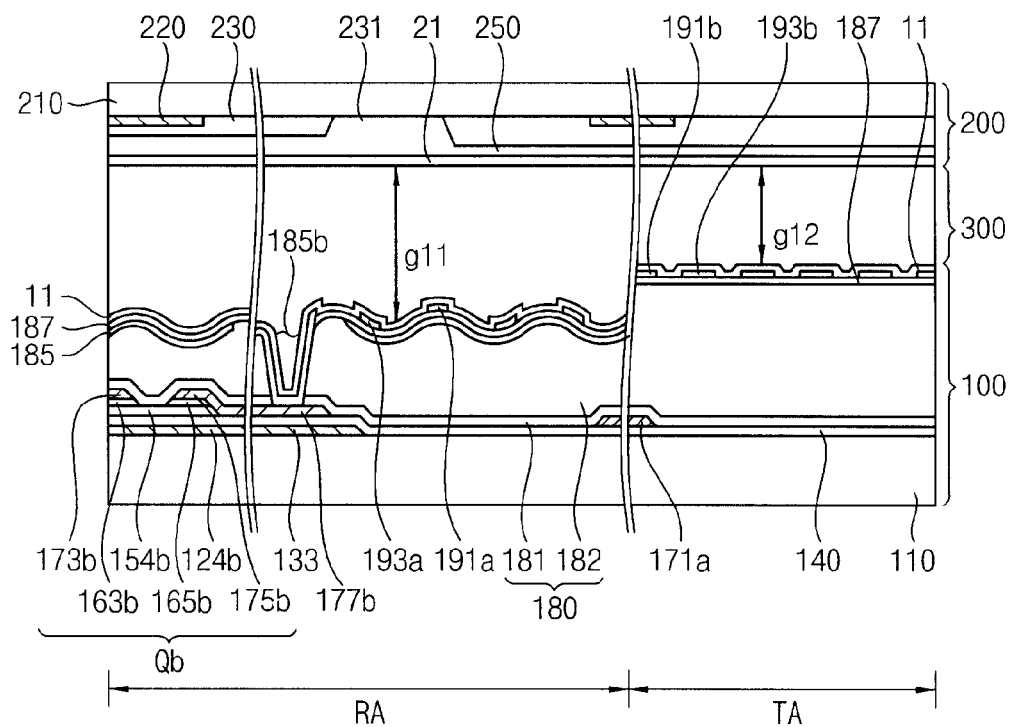
FIG. 2 is a cross-sectional view taken along line I-I' in FIG. 1.

FIG. 1 is a plan view illustrating a display panel according to an exemplary embodiment of the present invention. FIG. 2 is a cross-sectional view taken along line I-I' in FIG. 1.

Referring to FIG. 1 and FIG. 2, the display panel includes a display substrate 100, an opposite substrate 200 and a liquid crystal layer 300.

The display substrate 100 includes a lower base substrate 110 including a pixel area P including a transmissive area TA and a reflective area RA. A gate metal layer including a gate line 121 and a storage line 131 is formed on the lower base substrate 110. In this case, a size of the reflective area RA is greater than 0.4 times a size of the pixel area P.

In the present exemplary embodiment, the pixel area P includes the transmissive area TA and the reflective area RA. Alternatively, of two pixel areas P, one may include the transmissive area TA and one the reflective area RA, respectively.

The gate line 121 is extended in a horizontal direction to transmit a gate signal. Each of the gate lines 121 includes a first gate electrode 124a and a second gate electrode 124b.

The storage line 131 receives a voltage such as a common voltage, and is extended in the longitudinal direction. Each of the storage lines 131 includes a storage electrode 133.

Each of the first gate electrode 124a and the second gate electrode 124b has a rectangular shape, and the storage electrode 133 has a rectangular shape having two chamfered corners adjacent to a lower side. Alternatively, the first gate electrode 124a, the second gate electrode 124b, and the storage electrode 133 may have various shapes and various arrangements.

The gate insulation layer 140 is formed on the lower base substrate 110 to cover the gate line 121, the first gate electrode 124a, the second gate electrode 124b, the storage line 131 and the storage electrode 133.

A first semiconductor layer 154a and a second semiconductor layer 154b are formed on the gate insulation layer 140. The first semiconductor layer 154a and the second semiconductor layer 154b may include hydrogenated amorphous silicon, polycrystalline silicon, etc. The first semiconductor layer 154a and the second semiconductor layer 154b are formed on the first gate electrode 124a and the second gate electrode 124b, respectively.

A pair of first ohmic contact layers (not shown) is formed on the first semiconductor layer 154a and a pair of second ohmic contact layers 163b and 165b is formed on the second semiconductor layer 154b. Each of the first ohmic contact layers (not shown) and second ohmic contact layers 163b and 165b may include n+hydrogenated amorphous silicon that is implanted by n type impurities at a high concentration, silicide, etc.

A data metal layer including a first data line 171a, a second data line 171b, a first drain electrode 175a and a second drain electrode 175b is formed on the lower base substrate 110 including the first ohmic contact layers (not shown) and the second ohmic contact layers 163b and 165b.

The first data line 171a and the second data line 171b transmit data signals. The first data line 171a and the second data line 171b are extended in a vertical direction substantially crossing the gate line 121 and the storage line 131. The first data line 171a and the second data line 171b include a first source electrode 173a and a second source electrode 173b, respectively. The first source electrode 173a and the second source electrode 173b each have a U-shape bent toward the first gate electrode 124a and the second gate electrode 124b, respectively.

An end of a rod shape of each of the first drain electrode 175a and the second drain electrode 175b faces each of the first source electrode 173a and the second source electrode 173b, and is surrounded by each of the first source electrode 173a and the second source electrode 173b, respectively. A first contact electrode 177a extended to the first drain electrode 175a is overlapped with a left half of the storage electrode 133, and a second contact electrode 177b connected to the second drain electrode 175b is overlapped with a right half of the storage electrode 133.

The first gate electrode 124a, the first source electrode 173a, the first drain electrode 175a and the first semiconductor layer 154a form a first switching element Qa. The second gate electrode 124b, the second source electrode 173b, the second drain electrode 175b and the second semiconductor layer 154b form a second switching element Qb.

A channel of the first switching element Qa is formed in the first semiconductor layer 154a between the first source electrode 173a and the first drain electrode 175a. A channel of the second switching element Qb is formed in the second semiconductor layer 154b between the second source electrode 173b and the second drain electrode 175b.

One of the first ohmic contact layers (not shown) is formed between the first semiconductor layer 154a and the first source electrode 173a to decrease contact resistance between the first semiconductor layer 154a and the first source electrode 173a. The other of the first ohmic contact layers (not shown) is formed between the first semiconductor layer 154a and the first drain electrode 175a to decrease contact resistance between the first semiconductor layer 154a and the first drain electrode 175a. One of the second ohmic contact layers 163b and 165b is formed between the second semiconductor layer 154b and the second source electrode 173b to decrease contact resistance between the second semiconductor layer 154b and the second source electrode 173b. The other of the second ohmic contact layers 163b and 165b is formed between the second semiconductor layer 154b and the second drain electrode 175b to decrease contact resistance between the second semiconductor layer 154b and the second drain electrode 175b.

The first switching element Qa is electrically connected to the first data line 171a, and the second switching element Qb is electrically connected to the second data line 171b. The first switching element Qa and the second switching element Qb are formed in the pixel area P, on one side of the pixel area P.

Voltages having opposite polarity may be applied to the first data line 171a and the second data line 171b, respectively.

A data insulation layer 180 is formed on the gate insulation layer 140 to cover the first data line 171a, the second data line 171b, the first source electrode 173a, the second source electrode 173b, the first drain electrode 175a, and the second drain electrode 175b.

The data insulation layer 180 may include an inorganic insulation layer 181 and an organic insulation layer 182. The inorganic insulation layer 181 is formed to cover the first data line 171a, the second data line 171b, the first source electrode 173a, the second source electrode 173b, the first drain electrode 175a, and the second drain electrode 175b. In addition, the organic insulation layer 182 is formed to cover the inorganic insulation layer 181.

A surface of the organic insulation layer 182 corresponding to the reflective area RA has an embossing pattern. The embossing pattern includes a convex pattern and a concave pattern.

The convex pattern includes convex parts of hemispheres. The concave pattern includes concave parts of hemispheres. The convex parts and the concave parts are alternately formed, and the arrangement may be random.

A sum of diameters of a convex part and a concave part, which are adjacent, is from about 4 μm to about 25 μm. In addition, a difference distance between centers of the convex part and the concave part is from about 0.5 μm to about 2.5 μm.

A surface of the organic insulation layer 182 corresponding to the transmissive area TA is flat. In addition, a thickness of the organic insulation layer 182 corresponding to the reflective area RA may be less than that of the organic insulation layer 182 corresponding to the transmissive area TA.

A first contact hole 185a is formed on the first contact electrode 177a through the data insulation layer 180. A second contact hole 185b is formed on the second contact electrode 177b through the data insulation layer 180.

A reflective layer 185 is formed on the organic insulation layer 182 corresponding to the reflective area RA. Light incident on an external surface of the opposite substrate 200 is reflected by the reflective layer 185 after passing through the liquid crystal layer 300. The reflected light goes out of the opposite substrate 200 after passing through the liquid crystal layer 300 again.

An inorganic insulation layer 187 is formed on the reflective layer 185 and the data insulation layer 180. A pixel electrode 193 and a common electrode 191 are formed on the inorganic insulation layer 187. The common electrode 191 and the pixel electrode 193 may include a transparent conductive material such as indium tin oxide (ITO), indium zinc oxide (IZO), etc.

The common electrode 191 receives a first voltage level from the first data line 171a. The pixel electrode 193 receives a second voltage level from the second data line 171b.

The common electrode 191 includes a first sub-common electrode 191a corresponding to the reflective area RA, and a second sub-common electrode 191b corresponding to the transmissive area TA.

The pixel electrode 193 includes a first sub-pixel electrode 193a corresponding to the reflective area RA, and a second sub-pixel electrode 193b corresponding to the transmissive area TA.

The first sub-common electrode 191a and the first sub-pixel electrode 193a are alternately disposed, and the second sub-common electrode 191b and the second sub-pixel electrode 193b are alternately disposed.

In this case, the first sub-common electrodes 191a and the corresponding first sub-pixel electrodes 193a are defined as first electrode bars. The second sub-common electrodes 191b and the corresponding second sub-pixel electrodes 193b are defined as second electrode bars. The first electrode bars and the second electrode bars may have widths less than about 15 µm.

The first common electrode 191a makes contact with the first contact electrode 177a, and the first pixel electrode 193a makes contact with the second contact electrode 177b.

The first electrode bars are spaced apart from each other by a first separation distance d1. A plurality of first separation distances d1 is uniform.

The second electrode bars are spaced apart from each other by a second separation distance d2. A plurality of second separation distances d2 is uniform.

Therefore, an average of the first separation distances d1 is the same as the first separation distance d1, and an average of the second separation distances d2 is the same as the second separation distance d2. The first separation distance d1 may be from about 5 µm to about 30 µm, and the second separation distance d2 may be from about 3 µm to about 24 µm.

The average of the first separation distances d1 may be greater than that of the second separation distances d2. In the present exemplary embodiment, a first cell gap g11 which is a cell gap of the liquid crystal layer 300 corresponding to the reflective area RA is greater than a second cell gap g12 which is a cell gap of the liquid crystal layer 300 corresponding to the transmissive area TA. Therefore, the average of the first separation distances d1 is more than twice the average of the second separation distances d2.

In the present exemplary embodiment, the pixel area P has a zigzag shape.

The first sub-common electrode 191a is electrically connected to the first contact hole 185a. The first sub-common electrode 191a and the second sub-common electrode 191b are formed on the upper outer area of the pixel area P, and overlap the first data line 171a and the second data line 171b. Specifically, the first sub-common electrode 191a overlaps the first data line 171a and the second data line 171b in the reflective area RA, and the second sub-common electrode 191b overlaps the first data line 171a and the second data line 171b in the transmissive area TA. The second sub-common electrode 191b is formed in the outer area of the pixel area P.

Additionally, the second sub-common electrode 191b of the upper outer area of the pixel area is extended toward the lower area of the pixel area P, and the second sub-common electrode 191b is formed in a zigzag shape at an inside area surrounded by the first data line 171a, the second data line 171b and the upper outer area of the pixel area P. A portion of the second sub-common electrode 191b is connected to the first sub-common electrode 191a of the reflective area RA, and the first sub-common electrode 191a is formed in a zigzag shape between the first data line 171a and the second data line 171b. The portion of the second sub-common electrode 191b is protruded toward the reflective area RA to form the first sub-common electrode 191a. Thus, a size of the second sub-common electrode 191b is larger than a size of the first sub-common electrode 191a.

The first sub-pixel electrode 193a is electrically connected to the second contact hole 185b and formed to partly cover the storage line 131 close to the second contact hole 185b in a horizontal direction. The first sub-pixel electrode 193a in the horizontal direction is extended upwardly between the first data line 171a and the second data line 171b. The first sub-pixel electrode 193a is connected to the second sub-pixel electrode 193b of the transmissive area TA, and the second sub-pixel electrode 193b is extended toward the inside area surrounded by the first data line 171a, the second data line 171b and the upper outer area of the pixel area P. In this case, at a boundary between the reflective area RA and the transmissive area TA, the first sub-pixel electrode 193a is divided. Thus, a size of the second sub-pixel electrode 193b is larger than a size of the first sub-pixel electrode 193a.

A lower alignment layer 11 is formed on the lower base substrate 110 including the common electrode 191 and the pixel electrode 193 to align liquid crystal molecules of the liquid crystal layer 300 in a vertical direction. Thus, the liquid crystal molecules of the liquid crystal layer 300 are aligned from the display substrate 100 toward the opposite substrate 200.

The opposite substrate 200 faces the display substrate 100.

The opposite substrate 200 includes an upper base substrate 210, a light-blocking pattern 220, a color filter pattern 230, an overcoating layer 250 and an upper alignment layer 21.

The light-blocking pattern 220 may prevent leakage of light between transparent electrodes including the common electrode 191 and the pixel electrode 193, and defines an opening region facing the common electrode 191 and the pixel electrode 193. The color filter pattern 230 is formed in the opening region defined by the light-blocking pattern 220.

A thickness of the color filter pattern 230 corresponding to the reflective area RA may be less than that of the color filter pattern 230 corresponding to the transmissive area TA. In addition, the color filter pattern 230 corresponding to the reflective area RA may include a light hole 231.

The color filter pattern 230 may include a red color filter, a green color filter and a blue color filter. The overcoating layer 250 covers the color filter pattern 230 and the light-blocking pattern 220.

The overcoating layer 250 is formed on the light-blocking pattern 220 and the color filter pattern 230. The overcoating layer 250 may include an insulating material. For example, the overcoating layer 250 may have a substantially flat surface to cover the color filter 230. Alternatively, the overcoating layer 250 may be omitted.

The upper alignment layer 21 is formed on the overcoating layer 250 to align the liquid crystal molecules of the liquid crystal layer 300 in the vertical direction.

The liquid crystal layer 300 is formed between the display substrate 100 and the opposite substrate 200. The liquid crystal layer 300 includes the liquid crystal molecules having positive dielectric anisotropy. When the electric field is not applied to the liquid crystal molecules, the liquid crystal molecules are vertically aligned with respect to the surfaces of the display substrate 100 and the opposite substrate 200.

The liquid crystal molecules of the liquid crystal layer 300 vary their arrangement in response to an electric field formed between the first sub-common electrode 191a and the first sub-pixel electrode 193a, and an electric field formed between the second sub-common electrode 191b and the second sub-pixel electrode 193b. Thus, light transmittance of the liquid crystal layer 300 is changed.

For example, when different voltages are applied to the first sub-common electrode 191a and the first sub-pixel electrode 193a, an electric field substantially parallel with the surfaces of the display substrate 100 and the opposite substrate 200 may be formed between the sub-common electrode 191a and the first sub-pixel electrode 193a.

Similarly, when different voltages are applied to the second sub-common electrode 191b and the second sub-pixel electrode 193b, an electric field substantially parallel with the surfaces of the display substrate 100 and the opposite substrate 200 may be formed between the second sub-common electrode 191b and the second sub-pixel electrode 193b.

In this case, the first separation distance d1 between the first sub-common electrode 191a and the first sub-pixel electrode 193a adjacently formed is greater than the second separation distance d2 between the second sub-common electrode 191b and the second sub-pixel electrode 193b adjacently formed.

Therefore, the electric field in the reflective area RA is weaker than the electric field in the transmissive area TA.

Then, the vertically aligned liquid crystal molecules with respect to the display substrate 100 and the opposite substrate 200 change arrangement, so that the liquid crystal molecules are inclined toward the horizontal direction substantially parallel with the direction of the electric field. Thus, polarizing characteristics of the liquid crystal layer 300 are changed, so that the light transmittance of the liquid crystal layer 300 is changed, thereby displaying an image.

The electric field in the reflective area RA is weaker than that in the transmissive area TA so that the liquid crystal molecules in the electric field in the reflective area RA are inclined less than those in the transmissive area TA. Accordingly, a first phase delay corresponding to the reflective area RA is about half of a second phase delay corresponding to the transmissive area TA. That is, the phase delay through the whole area of the display panel is uniform because light passes once through the display panel corresponding to the transmissive area TA and light passes twice through the display panel corresponding to the reflective area RA. Thus, V-T curve characteristics of the reflective area RA and the transmissive area TA may be equal to each other. In addition, V-R curve characteristics of the reflective area RA and the transmissive area TA may be equal to each other.

When a liquid crystal display (LCD) device having the display panel uses the vertically aligned liquid crystal molecules, contrast ratio and viewing angle of the LCD device are improved. Also, two different voltages having opposite polarities with respect to the common voltage are applied to the common electrode 191 and the pixel electrode 193, so that driving voltage of the switching elements Qa and Qb and the response speed of the liquid crystal molecules are improved. Furthermore, cell gaps of the LCD are uniform so that defects are prevented and a large-scale display panel may be used.

Figure 3:
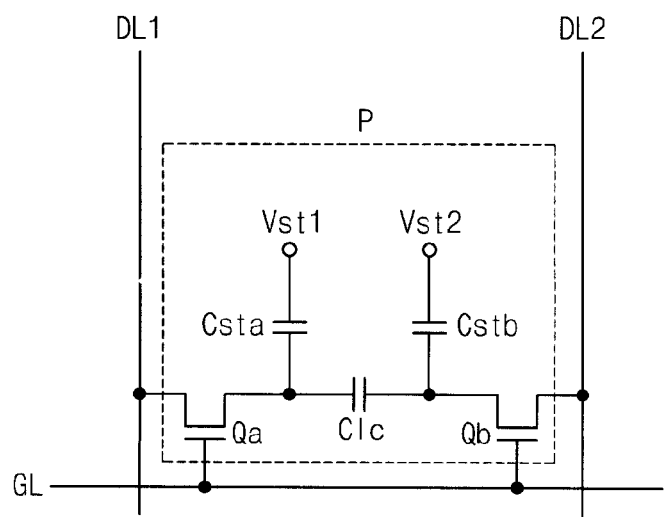
FIG. 3 is an equivalent circuit diagram illustrating a pixel area in FIG. 1.

FIG. 3 is an equivalent circuit diagram illustrating a pixel area in FIG. 1.

Referring to FIG. 1, FIG. 2, and FIG. 3, a first data line DL1, a second data line DL2 and a gate line GL respectively represent the first data line 171a, the second data line 171b and the gate line 121 in FIG. 1.

The voltages having the opposite polarities are applied to the first data line DL1 and the second data line DL2, respectively. A power voltage and a ground voltage may be alternately applied to the first data line DL1 and the second data line DL2 in every frame.

The gate line GL receives a gate signal and turns on the first switching element Qa and the second switching element Qb according to the gate signal.

When the first switching element Qa and the second switching element Qb are turned on, the common electrode 191 is connected to the first data line DL1 and the pixel electrode 193 is connected to the second data line DL2.

The common electrode 191, the pixel electrode 193, and the liquid crystal layer 300 form a liquid crystal capacitor Clc so that the electrodes maintain the voltages after the first switching element Qa and the second switching element Qb are turned off.

The first contact electrode 177a and the second contact electrode 177b of the first drain electrode 175a and the second drain electrode 175b respectively connected to a first sub-common electrode 191a and the first sub-pixel electrode 193a overlap the gate insulation layer 140 and the storage electrode 133 to form a first storage capacitor Csta and a second storage capacitor Cstb. The first storage capacitor Csta and the second storage capacitor Cstb maintain the voltage difference applied to the liquid crystal capacitor Clc. In this case, the storage line 131 for forming the first storage capacitor Csta and the second storage capacitor Cstb may be omitted when duration of a frame is short such as in a 120 Hz LCD or a 240 Hz LCD.

Figure 4:
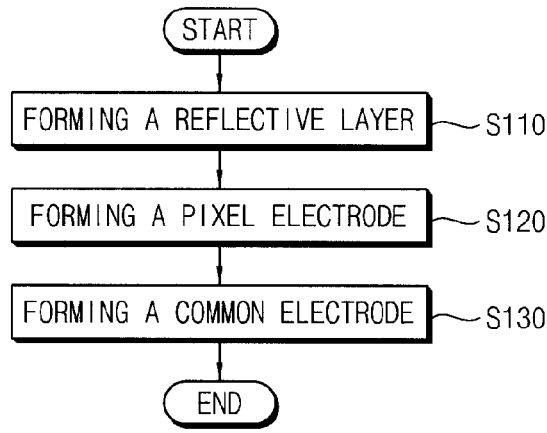
FIG. 4 is a flowchart illustrating a method of manufacturing a display substrate of FIG. 1.

FIG. 4 is a flowchart illustrating an exemplary embodiment of a method of manufacturing a display substrate of FIG. 1.

Referring to FIG. 2 and FIG. 4, the data insulation layer 180 having the embossing pattern corresponding to the reflective area RA is formed over the lower base substrate 110 including the pixel areas P including the transmissive area TA and the reflective area RA. In this case, the data insulation layer 180 corresponding to the transmissive area TA has the flat shape. The reflective layer 185 is formed on the data insulation layer 180 having the embossing pattern (step S110).

Then, the pixel electrode 193 is formed over the lower base substrate 110 including the reflective layer 185 (step S120). The pixel electrode 193 includes the first sub-pixel electrode 193a corresponding to the reflective area RA and the second sub-pixel electrode 193b corresponding to the transmissive area TA.

Then, the common electrode 191 is formed over the lower base substrate 110 including the reflective layer 185 (step S130). The common electrode 191 includes the first sub-common electrode 191a corresponding to the reflective area RA and the second sub-common electrode 191b corresponding to the transmissive area TA.

Figure 5:
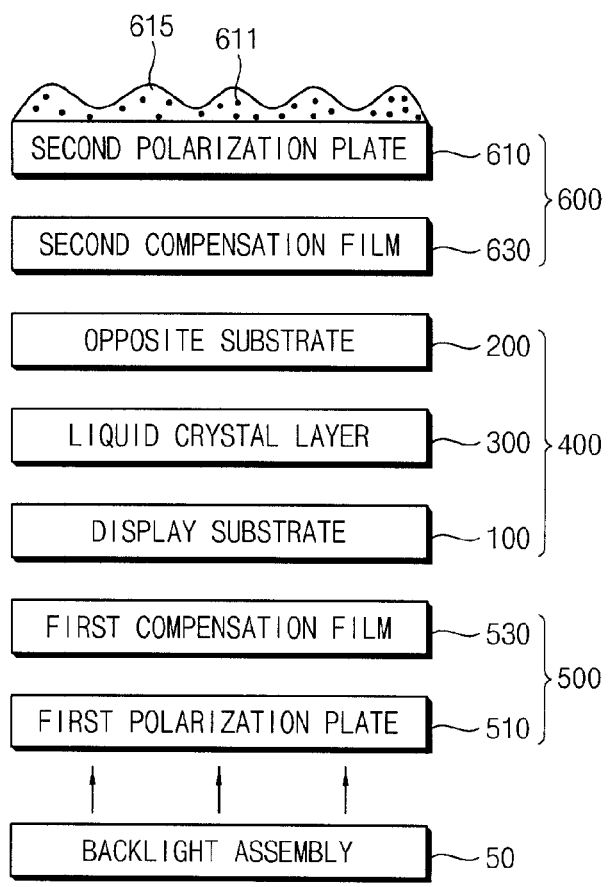
FIG. 5 is a block diagram illustrating a light route of a liquid crystal display (LCD) device including the display panel of FIG. 1.

FIG. 5 is a block diagram illustrating a light route of an LCD device including the display panel of FIG. 1.

Referring to FIG. 5, the LCD according to the present exemplary embodiment includes a display panel 400, a first optical unit 500, a second optical unit 600 and a backlight unit 50.

The first and second optical units 500 and 600 are defined as an optical film assembly. The optical film assembly changes a polarization state of light provided from the backlight unit 50.

The display panel 400 includes the display substrate 100, the opposite substrate 200 and the liquid crystal layer 300.

The first optical unit 500 is disposed under the display panel 400. The first optical unit 500 includes a plurality of optical films.

For example, the first optical unit 500 includes a first polarization plate 510 and a first compensation film 530. The first polarization plate 510 is disposed under the display panel 400, and the first compensation film 530 is disposed between the first polarization plate 510 and the display panel 400. Accordingly, light generated from the backlight unit 50 disposed under the first polarization plate 510 passes through the first polarization plate 510 and the first compensation film 530, and is applied to the display panel 400.

The second optical unit 600 includes a plurality of optical films. For example, the second optical unit 600 includes a second polarization plate 610 and a second compensation film 630. The second polarization plate 610 is disposed over the display panel 400. The second compensation film 630 is disposed between the second polarization plate 610 and the display panel 400. An adhesive layer 615 including scattering particles 611 is spread on the second polarization plate 610. The adhesive layer 615 may be spread under the second polarization plate 610 or on both surfaces of the second polarization plate 610. The adhesive layer 615 may have an embossing pattern and be spread on the second polarization plate 610. The second polarization plate 610 including the adhesive layer 615 may prevent interference fringes having rainbow colors when the LCD device is driven.

Figure 6A:
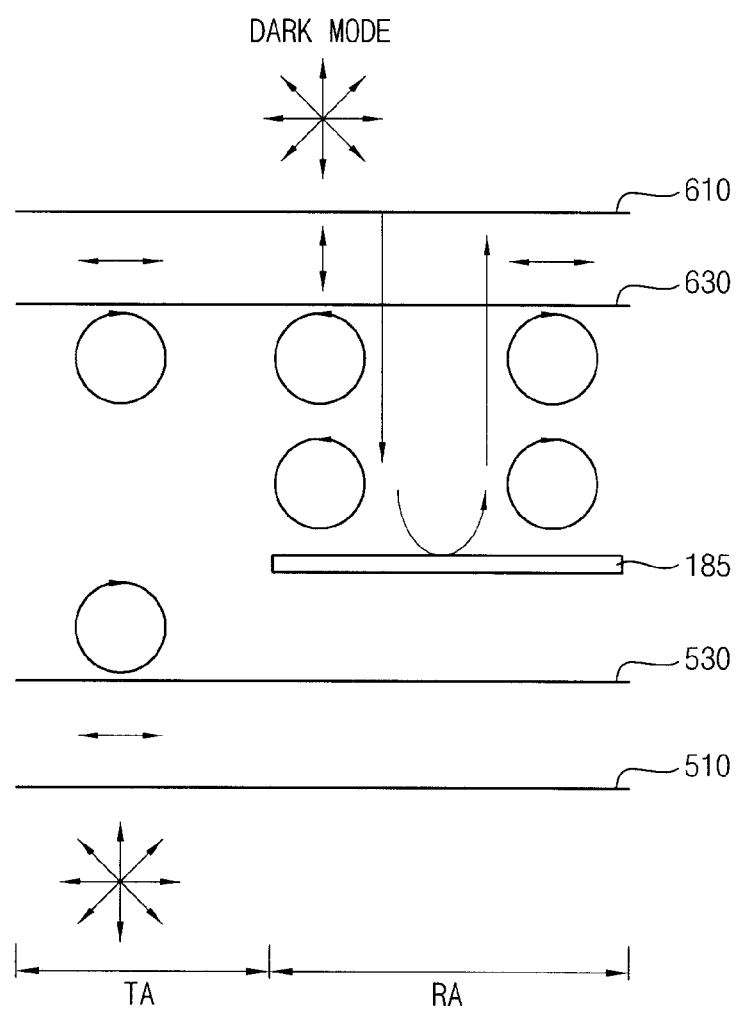
FIG. 6A and FIG. 6B are schematic diagrams illustrating polarization states of light when the LCD device of FIG. 5 is driven.
Figure 6B:
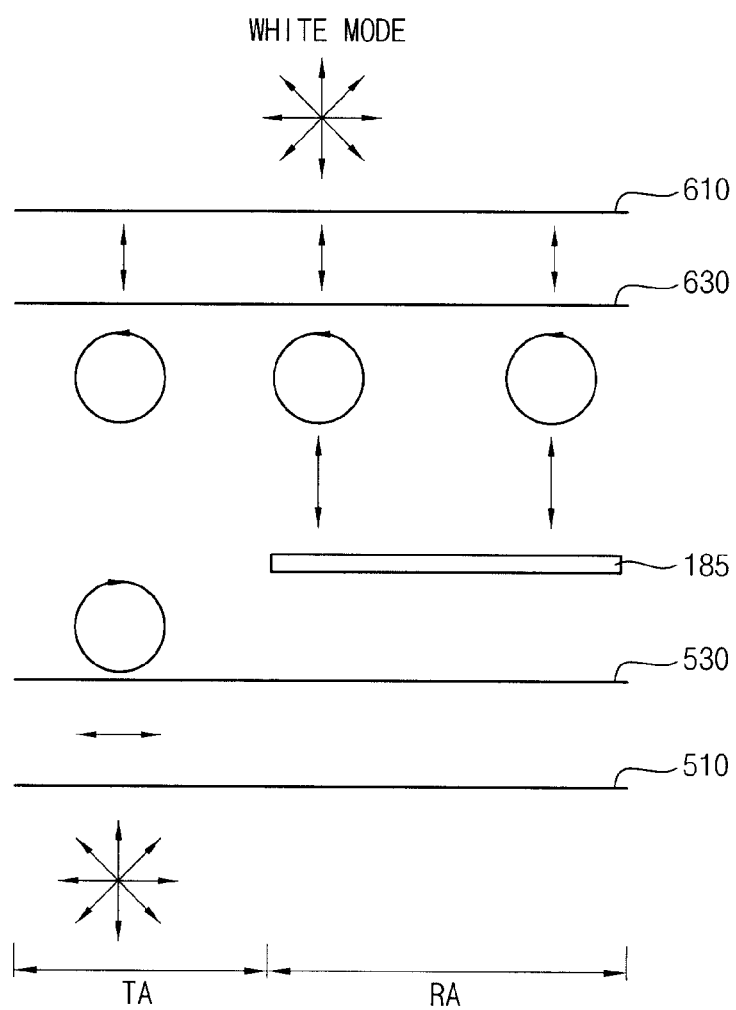

FIG. 6A and FIG. 6B are schematic diagrams illustrating polarization states of light when the LCD device of FIG. 5 is driven.

Referring to FIG. 5, FIG. 6A, and FIG. 6B, the first compensation film 530 and the second compensation film 630 may be used so that a dark mode and a white mode on both the transmissive area TA and the reflective area RA are displayed. The first compensation film 530 and the second compensation film 630 respectively include ¼λ plates.

In the present exemplary embodiment, the ¼λ plates are used as the first compensation film 530 and the second compensation film 630. Alternatively, ¼λ+½λ plates may be used as the first compensation film 530 and the second compensation film 630.

The dark mode is illustrated in FIG. 6A as an off state when a driving voltage is not applied to the display panel 400. The white mode is illustrated in FIG. 6B as an on state when the driving voltage is applied to the display panel 400.

Referring to FIG. 6A again, the first compensation film 530 is disposed on a rear face of the display substrate 100. The first polarizing plate 510 is disposed under the first compensation film 530. The second compensation film 630 is disposed on the opposite substrate 200. The second polarizing plate 610 is disposed on the second compensation film 630.

Corresponding to the reflective area RA, a first light being incident into the second polarizing plate 610 is linearly polarized by the second polarizing plate 610. Then the first light is circularly polarized along a first polarization direction by the second compensation film 630 and is incident into the liquid crystal layer 300.

The polarization direction of the first light passing through the liquid crystal layer 300 in the off state may not vary. When the first light is reflected from the reflective layer 185 after passing through the liquid crystal layer 300, the phase of the first light is inverted. Thus, the first light after reflection may be circularly polarized light along a second polarization direction and is again incident into the second compensation film 630.

The second polarization direction is referred to as a direction having a 180-degree phase difference with respect to the first polarization direction.

The first light which is circularly polarized along the second polarization direction may be linearly polarized by the second compensation film 630. The first light is blocked by the second polarizing plate 610 so that the dark mode may be displayed.

On the other hand, corresponding to the transmissive area TA, a second light being incident into the first polarizing plate 510 is linearly polarized by the first polarizing plate 510. Then, the second light is circularly polarized along the second polarization direction by the first compensation film 530 and is incident into the liquid crystal layer 300 through the second electrode bar. The first polarization direction and the second polarization direction are used for convenience so as to discriminate circular polarization directions.

The liquid crystal layer 300 in the off state maintains the polarization direction of the second light. Thus, the second light which is circularly polarized along the second polarization direction may be linearly polarized by the second compensation film 630. The second light is blocked by the second polarizing plate 610 whose polarizing axis is perpendicular to that of the first polarizing plate 510 so that the dark mode may be displayed.

Thus, the dark mode is displayed in the transmissive area TA and the reflective area RA in the off state.

Referring to FIG. 1 and FIG. 6B again, the display panel 400 may alter the polarization direction of incident light.

The liquid crystal molecules of the liquid crystal layer 300 corresponding to the reflective area RA are realigned due to the electric field generated by the first sub-common electrode 191a to which the first voltage level is applied and the first sub-pixel electrode 193a to which the second voltage level is applied. Thus, the first light passing once through the liquid crystal layer 300 may experience a ¼λ phase difference.

The first light which is circularly polarized along the first polarization direction by the second compensation film 630 is linearly polarized by the liquid crystal layer 300. The first light which is linearly polarized is incident into the first sub-common electrode 191a and the first sub-pixel electrode 193a. The first light reflected by the reflective layer 185 after passing through the first sub-common electrode 191a and the first sub-pixel electrode 193a is linearly polarized with a 180-degree phase, and passes through the liquid crystal layer 300 again. The first light passing through the liquid crystal layer 300 may experience a ¼λ phase difference and is circularly polarized along the first polarization direction.

The first light which is circularly polarized along the first polarization direction is linearly polarized by the second compensation film 630 and transmits through the second polarizing plate 610 so that the white mode may be displayed.

The liquid crystal molecules of the liquid crystal layer 300 in the transmissive area TA are realigned due to the electric field generated by the second sub-common electrode 191b to which the first voltage level is applied and the second subpixel electrode 193b to which the second voltage level is applied. Thus, the second light passing through the liquid crystal layer 300 may experience a ½λ phase difference.

Thus, the second light which is circularly polarized along the second polarization direction is circularly polarized along the first polarization direction by the liquid crystal layer 300. The second light which is circularly polarized along the first polarization direction may be linearly polarized by the second compensation film 630. The second light transmits through the second polarizing plate 610 so that the white mode may be displayed.

Thus, the white mode is displayed in the transmissive area TA and the reflective area RA in the on state.

Thus, light efficiency in the transmissive area TA and the reflective area RA may be 100%. Additionally, outdoor visibility of the display panel 400 may be high due to a transflective method. Therefore, the outdoor visibility may be enhanced when the area of the reflective area RA is increased.

Figure 7:
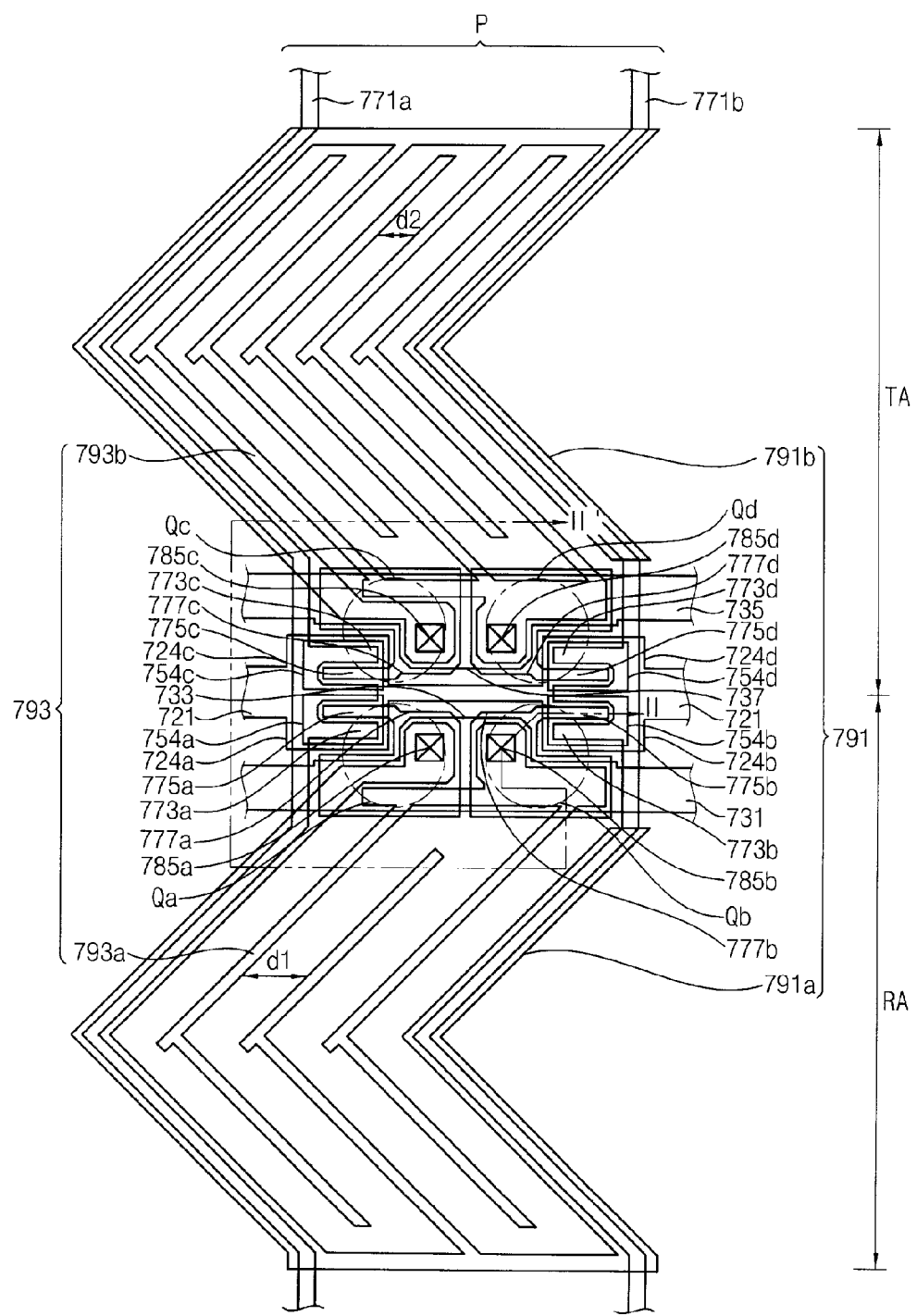
FIG. 7 is a plan view illustrating a display panel according to another exemplary embodiment of the present invention.
Figure 8:
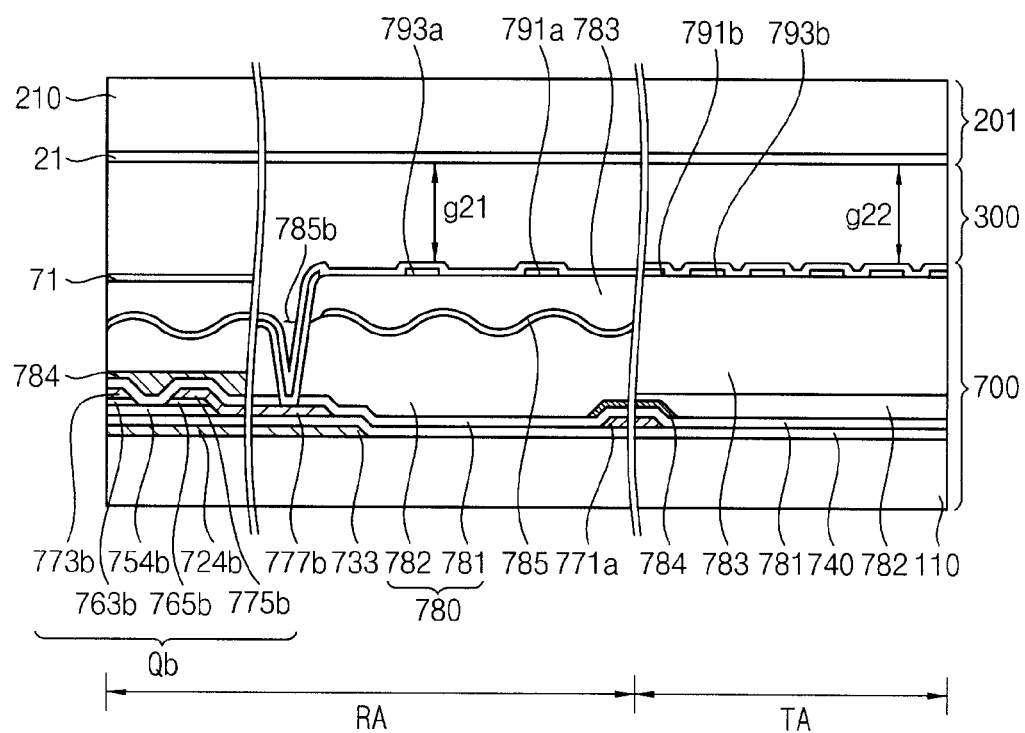
FIG. 8 is a cross-sectional view taken along line II-IF in FIG. 7.

FIG. 7 is a plan view illustrating a display panel according to another exemplary embodiment of the present invention. FIG. 8 is a cross-sectional view taken along line II-II' in FIG. 7.

The display panel according to the present exemplary embodiment is substantially the same as the display panel according to the previous exemplary embodiment in FIG. 1 except that a display substrate 700 of the display panel includes switching elements at a center line of a pixel area P and except that the display substrate 700 includes a color filter pattern. Thus, the same reference numerals are used for the same elements, and thus, a detailed description thereof will be omitted.

Referring to FIGS. 7 and 8, the display panel includes a display substrate 700, an opposite substrate 201 and the liquid crystal layer 300.

A gate metal layer including a gate line 721, a first storage line 731 and a second storage line 735 is formed on the lower base substrate 110.

The gate line 721 includes a first gate electrode 724a and a second gate electrode 724b protruded downward, and a third gate electrode 724c and a fourth gate electrode 724d protruded upward.

The first storage line 731 and the second storage line 735 include a first storage electrode 733 and a second storage electrode 737, respectively.

A gate insulation layer 740 is formed on the lower base substrate 110 to cover the gate line 721, the first gate electrode 724a, the second gate electrode 724b, the third gate electrode 724c, the fourth gate electrode 724d, the first storage line 731, the second storage line 735, the first storage electrode 733, and the second storage electrode 737.

A first semiconductor layer 754a, a second semiconductor layer 754b, a third semiconductor layer 754c and a fourth semiconductor layer 754d are formed on the gate insulation layer 740. The first semiconductor layer 754a, the second semiconductor layer 754b, the third semiconductor layer 754c and the fourth semiconductor layer 754d are formed on the first gate electrode 724a, the second gate electrode 724b, the third gate electrode 724c and the fourth gate electrode 724d, respectively.

A pair of ohmic contact layers is formed on each of the first semiconductor layer 754a, the second semiconductor layer 754b, the third semiconductor layer 754c and the fourth semiconductor layer 754d. For example, a pair of ohmic contact layers 763b and 765b is formed on the second semiconductor layer 754b corresponding to the second switching element Qb.

A data metal layer including a first data line 771a, a second data line 771b, a first drain electrode 775a, a second drain electrode 775b, a third drain electrode 775c and a fourth drain electrode 775d is formed on the lower base substrate 110 including the ohmic contact layers corresponding to the first semiconductor layer 754a, the second semiconductor layer 754b, the third semiconductor layer 754c and the fourth semiconductor layer 754d.

The first data line 771a includes a first source electrode 773a and a third source electrode 773c having a W-shape bent toward the first gate electrode 724a and the third gate electrode 724c, respectively. The second data line 771b includes a second source electrode 773b and a fourth source electrode 773d having a W-shape bent toward the second gate electrode 724b and the fourth gate electrode 724d, respectively.

An end of a rod shape of each of the first drain electrode 775a and the third drain electrode 775c faces each of the first source electrode 773a and the third source electrode 773c, and is surrounded by each of the first source electrode 773a and the third source electrode 773c. An end of a rod shape of each of the second drain electrode 775b and the fourth drain electrode 775d faces each of the second source electrode 773b and the fourth source electrode 773d, and is surrounded by each of the second source electrode 773b and the fourth source electrode 773d.

A first contact electrode 777a formed by protruding the first drain electrode 775a is overlapped with a left half of the first storage electrode 733, and a second contact electrode 777b formed by protruding the second drain electrode 775b is overlapped with a right half of the second storage electrode 733.

A third contact electrode 777c formed by protruding the third drain electrode 775c is overlapped with a left half of the second storage electrode 737, and a fourth contact electrode 777d formed by protruding the fourth drain electrode 775d is overlapped with a right half of the second storage electrode 737.

The first gate electrode 724a, the first source electrode 773a, the first drain electrode 775a and the first semiconductor layer 754a form a first switching element Qa. The second gate electrode 724b, the second source electrode 773b, the second drain electrode 775b and the second semiconductor layer 754b form the second switching element Qb. The third gate electrode 724c, the third source electrode 773c, the third drain electrode 775c and the third semiconductor layer 754c form a third switching element Qc. The fourth gate electrode 724d, the fourth source electrode 773d, the fourth drain electrode 775d and the fourth semiconductor layer 754d form a fourth switching element Qd.

The first switching element Qa and the third switching element Qc are electrically connected to the first data line 771a. The second switching element Qb and the fourth switching element Qd are electrically connected to the second data line 771b. The first switching element Qa, the second switching element Qb, the third switching element Qc and the fourth switching element Qd are formed in the pixel area P.

Voltages having opposite levels are applied to the first data line 771a and the second data line 771b, respectively.

A data insulation layer 780 is formed on the gate insulation layer 740 to cover the first data line 771a, the second data line 771b, the first source electrode 773a, the second source electrode 773b, the third source electrode 773c, the fourth source electrode 773d, the first drain electrode 775a, the second drain electrode 775b, the third drain electrode 775c and the fourth drain electrode 775d.

The data insulation layer 780 includes an inorganic insulation layer 781 and an organic insulation layer 782. The inorganic insulation layer 781 is substantially the same as the inorganic insulation layer 181 according to the previous exemplary embodiment. Thus, a detailed description thereof will be omitted.

A light-blocking pattern 784 is formed on the inorganic insulation layer 781 corresponding to the first switching element Qa, the second switching element Qb, the third switching element Qc, the fourth switching element Qd, the gate line 721, the first storage line 731, the second storage line 735, the first data line 771a and the second data line 771b.

The organic insulation layer 782 is formed on the light-blocking pattern 784 and the inorganic insulation layer 781.

The organic insulation layer 782 according to the present exemplary embodiment is substantially the same as the organic insulation layer 182 according to the previous exemplary embodiment except that a thickness of the organic insulation layer 782 corresponding to the reflective area RA is greater than a thickness of the organic insulation layer 782 corresponding to the transmissive area TA. Thus, a detailed description thereof will be omitted.

A reflective layer 785 according to the present exemplary embodiment is substantially the same as the reflective layer 185 according to the previous exemplary embodiment. Thus, a detailed description thereof will be omitted.

A color filter pattern 783 is formed on the reflective layer 785 and the organic insulation layer 782. In this case, a thickness of the color filter pattern 783 corresponding to the transmissive area TA is greater than a thickness of the color filter pattern 783 corresponding to the reflective area RA. Thus, cell gaps through all areas of the display panel are uniform and a pixel electrode may be formed on the color filter pattern 783 having a substantially flat surface. Accordingly, a third cell gap g21 of the liquid crystal layer 300 in the reflective area RA is the same as a fourth cell gap g22 of the liquid crystal layer 300 in the transmissive area TA.

A common electrode 791 and a pixel electrode 793 including a transparent conductive material such as indium tin oxide (ITO), indium zinc oxide (IZO), etc., are formed on the color filter pattern 783.

The common electrode 791 receives a first voltage level from the first data line 771a. The pixel electrode 793 receives a second voltage level from the second data line 771b.

The common electrode 791 includes a first sub-common electrode 791a corresponding to the reflective area RA, and a second sub-common electrode 791b corresponding to the transmissive area TA.

The pixel electrode 793 includes a first sub-pixel electrode 793a corresponding to the reflective area RA, and a second sub-pixel electrode 793b corresponding to the transmissive area TA.

The first sub-common electrode 791a and the first sub-pixel electrode 793a are alternately disposed, and the second sub-common electrode 791b and the second sub-pixel electrode 793b are alternately disposed.

In this case, the first sub-common electrode 791a and the corresponding first sub-pixel electrode 793a are defined as first electrode bars, and the second sub-common electrode 791b and the corresponding second sub-pixel electrode 793b are defined as second electrode bars.

The first sub-common electrode 791a makes contact with the first contact electrode 777a, and the first sub-pixel electrode 793a makes contact with the second contact electrode 777b.

The second sub-common electrode 791b makes contact with the third contact electrode 777c, and the second sub-pixel electrode 793b makes contact with the fourth contact electrode 777d.

The first contact electrode 777a and the third contact electrode 777c may receive the first voltage level from the first data line 771a. The second contact electrode 777b and the fourth contact electrode 777d may receive the second voltage level from the second data line 771b.

According to the present exemplary embodiment, a first separation distances d1 between the first electrode bars and a second separation distances d2 between the second electrode bars are substantially the same as the first separation distances d1 and the second separation distances d2 according to the previous exemplary embodiment. Thus, a detailed description thereof will be omitted.

In the present exemplary embodiment, a first cell gap g21 which is a cell gap of the liquid crystal layer 300 corresponding to the reflective area RA is substantially equal to a second cell gap g22 which is a cell gap of the liquid crystal layer 300 corresponding to the transmissive area TA. Therefore, the average of the first separation distances d1 is about twice the average of the second separation distances d2.

The common electrode 791 and the pixel electrode 793 are substantially the same as the common electrode 191 and the pixel electrode 193. Thus, a detailed description thereof will be omitted.

The first sub-common electrode 791a and the second sub-common electrode 791b are respectively formed in the upper outer area of the pixel area P and the lower outer area of the pixel area P to overlap the first data line 771a and the second data line 771b.

For example, the first sub-common electrode 791a is formed in the reflective area RA to overlap the first data line 771a and the second data line 771b. The second sub-common electrode 791b is formed in the transmissive area TA to overlap the first data line 771a and the second data line 771b. The first sub-common electrode 791a is formed in the lower outer area of the pixel area P and the second sub-common electrode 791b is formed in the upper outer area of the pixel area P.

Additionally, the first sub-common electrode 791a of the lower outer area of the pixel area P is extended toward the upper area of the pixel area P, and the first sub-common electrode 791a is formed in a zigzag shape in an inside area surrounded by the first data line 771a, the second data line 771b and the lower outer area of the pixel area P. The second sub-common electrode 791b of the upper outer area of the pixel area P is extended toward the lower area of the pixel area P, and the second sub-common electrode 791b is formed in a zigzag shape in an inside area surrounded by the first data line 771a, the second data line 771b and the upper outer area of the pixel area P.

In this case, a size of the first sub-common electrode 791a is larger than a size of the second sub-common electrode 791b.

The first sub-pixel electrode 793a is formed close to a second contact hole 785b and formed to partly cover the first storage line 731 in a horizontal direction. The first sub-pixel electrode 793a in the horizontal direction is extended downwardly in a zigzag shape between the first data line 771a and the second data line 771b. The first sub-pixel electrode 793a is extended between the first data line 771a and the second data line 771b, and to the lower outer area of the pixel area P.

The second sub-pixel electrode 793b is formed close to a fourth contact hole 785d and formed to partly cover the second storage line 735 in a horizontal direction. The second sub-pixel electrode 793b in the horizontal direction is extended upwardly in a zigzag shape between the first data line 771a and the second data line 771b. The second sub-pixel electrode 793b is extended between the first data line 771a and the second data line 771b, and to the upper outer area of the pixel area P. In this case, a size of the second sub-pixel electrode 793b is larger than that of the first sub-pixel electrode 793a.

A lower alignment layer 71 is substantially the same as the lower alignment layer 11 according to the previous exemplary embodiment. Thus, a detailed description thereof will be omitted.

The opposite substrate 201 includes an upper base substrate 210 and an upper alignment layer 21.

Since the light-blocking pattern 220 and the color filter pattern 230 according to the previous exemplary embodiment are included in the display substrate 700, the opposite substrate 210 includes only the upper base substrate 210 and the upper alignment layer 21. The upper base substrate 210 and the upper alignment layer 21 are substantially the same as those of the previous exemplary embodiment. Thus, a detailed description thereof will be omitted.

Figure 9:
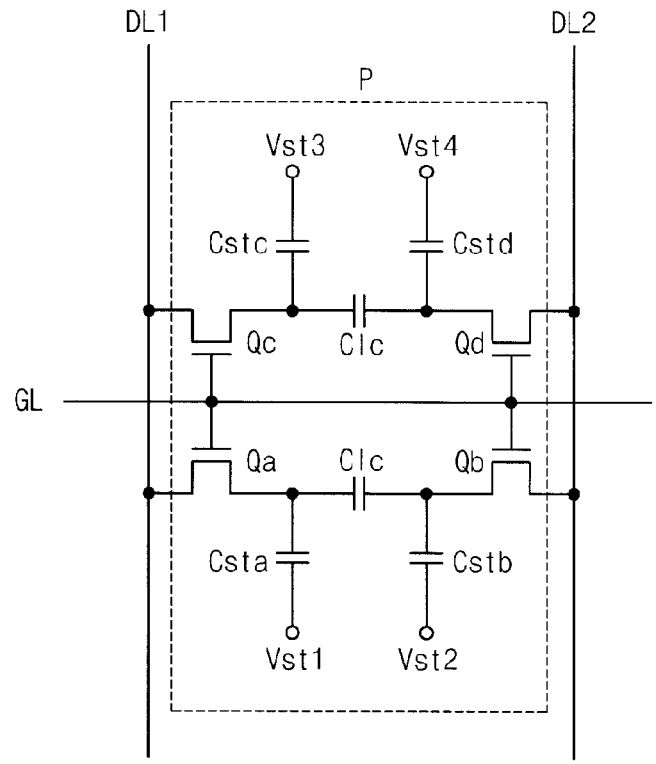
FIG. 9 is an equivalent circuit diagram illustrating a pixel area in FIG. 7.

FIG. 9 is an equivalent circuit diagram illustrating a pixel area in FIG. 7.

Referring to FIG. 7, FIG. 8, and FIG. 9, a first data line DL1, a second data line DL2 and a gate line GL respectively represent the first data line 771a, the second data line 771b and the gate line 721 in FIG. 7.

The gate line GL receives a gate signal and turns on the first switching element Qa, the second switching element Qb, the third switching element Qc and the fourth switching element Qd according to the gate signal.

When the first switching element Qa, the second switching element Qb, the third switching element Qc and the fourth switching element Qd are turned on, the first sub-common electrode 791a and the second sub-common electrode 791b are connected to the first data line DL1 through the first switching element Qa and the third switching element Qc, and the first sub-pixel electrode 973a and the second sub-pixel electrode 973b are connected to the second data line DL2 through the second switching elements Qb and the fourth switching element Qd.

A liquid crystal capacitor Clc is formed by the common electrode 791, the pixel electrode 793, and the liquid crystal layer 300 so that the electrodes maintain the voltages after the first switching element Qa, the second switching element Qb, the third switching element Qc and the fourth switching element Qd are turned off.

The first contact electrode 777a, the second contact electrode 777b, the third contact electrode 777c and the fourth contact electrode 777d overlap the gate insulation layer 740, and respectively overlap the first storage electrode 733 and the second storage electrode 737 to form a first storage capacitor Csta, a second storage capacitor Cstb, a third storage capacitor Cstc and a fourth storage capacitor Cstd. The first storage capacitor Csta, the second storage capacitor Cstb, the third storage capacitor Cstc and the fourth storage capacitor Cstd maintain the voltage difference applied to the liquid crystal capacitor Clc.

Figure 10:
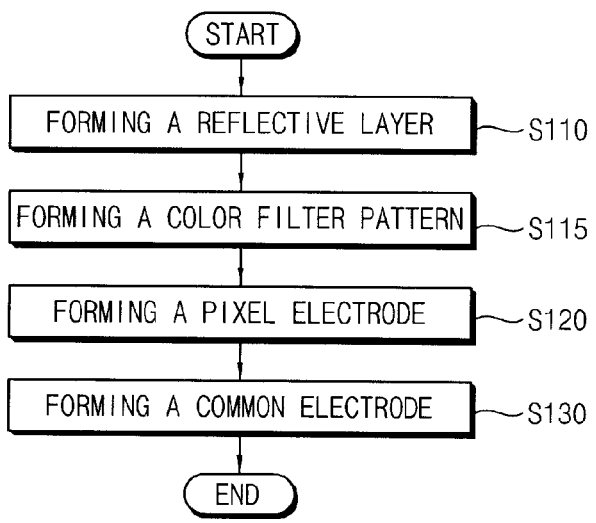
FIG. 10 is a flowchart illustrating a method of manufacturing a display substrate of FIG. 7.

FIG. 10 is a flowchart illustrating a method of manufacturing a display substrate in FIG. 7.

The manufacturing method according to the present exemplary embodiment is the same as the manufacturing method in FIG. 4 except that the manufacturing method includes forming the color filter pattern 783 on the lower base substrate 110 which includes the reflective layer 785 (step S115) after the reflective layer 785 is formed (step S110), and thus, a detailed description thereof will be omitted.

Referring to FIG. 7, FIG. 8 and FIG. 10, the color filter pattern 783 is formed on the lower base substrate 110 including the reflective layer 785 after Step S110 (step S115). Thus, the common electrode 791 and the pixel electrode 793 may be formed on the color filter pattern 783 having a substantially flat surface.

A thickness of the data insulation layer 780 corresponding to the reflective area RA may be greater than that of the data insulation layer 780 corresponding to the transmissive area TA. A thickness of the color filter pattern 783 corresponding to the reflective area RA may be less than that of the color filter pattern 783 corresponding to the transmissive area TA.

A block diagram illustrating a light route and schematic diagrams illustrating polarization states according to the present exemplary embodiment are substantially the same as the light route and the schematic diagrams in FIG. 5, FIG. 6A and FIG. 6B except that the display panel includes the display substrate 700, the opposite substrate 201 and the reflective layer 785 in FIG. 7 instead of the display substrate 100, the opposite substrate 200 and the reflective layer 185 in FIG. 1. Thus, the same reference numerals are used for the same elements, and thus, a detailed description thereof will be omitted.

The first electrode bars may be separated from the second electrode bars according to the present exemplary embodiment by the first switching element Qa, the second switching element Qb, the third switching element Qc and the fourth switching element Qd formed at the center of the pixel area P. Therefore, a manufacturing step in which the first electrode bars and the second electrode bars are formed may be performed correctly. In addition, a separation distance between the respective first electrode bars and a separation distance between the respective second electrode bars may be adjusted accurately.

Figure 11:
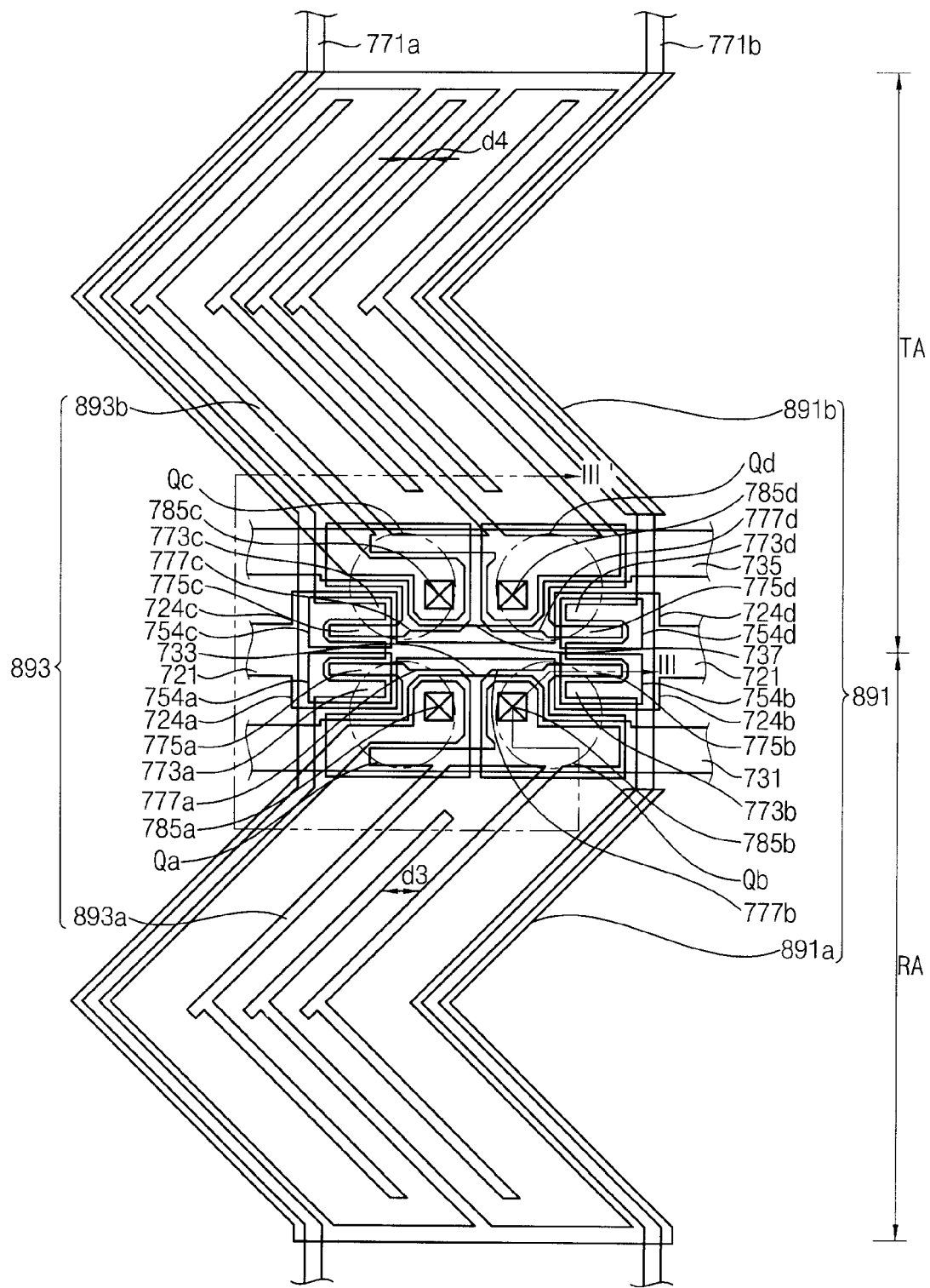
FIG. 11 is a plan view illustrating a display panel according to still another exemplary embodiment of the present invention.
Figure 12:
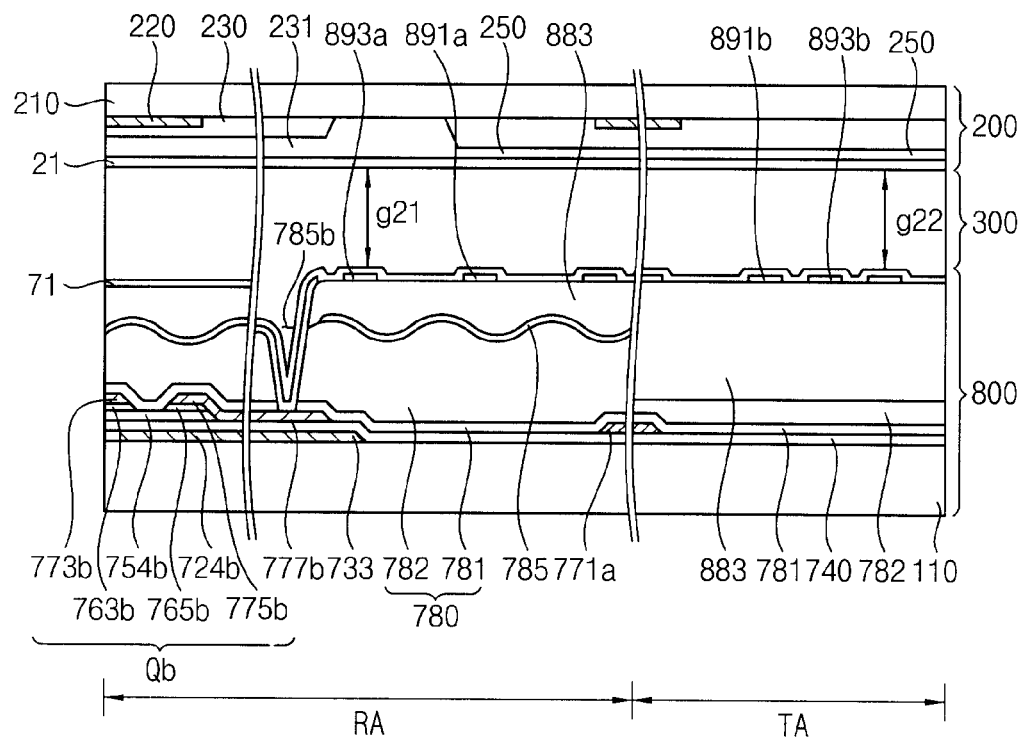
FIG. 12 is a cross-sectional view taken along line III-III' in FIG. 11.

FIG. 11 is a plan view illustrating a display panel according to still another exemplary embodiment of the present invention. FIG. 12 is a cross-sectional view taken along line III-III' in FIG. 11.

An opposite substrate 200 of the display panel according to the present exemplary embodiment is substantially the same as the opposite substrate 200 in FIG. 2. In addition, a display substrate 800 according to the present exemplary embodiment is substantially the same as the display substrate 700 in FIG. 8 except that the display substrate 800 includes a planarization layer 883 instead of the color filter pattern 783 and except that the display substrate 800 has different shapes of first electrode bars and second electrode bars. Thus, identical reference numerals are used in FIG. 8 to refer to components that are the same or like those shown in FIG. 2, and a detailed description thereof will be omitted.

Referring to FIG. 11 and FIG. 12, the display panel according to the present exemplary embodiment includes the display substrate 800, the opposite substrate 200 and the liquid crystal layer 300.

The display substrate 800 according to the present exemplary embodiment does not include the light-blocking pattern 784 in FIG. 8

The planarization layer 883 is formed on the reflective layer 785 and the organic insulation layer 782. Therefore, cell gaps of the display panel may be equal to each other through the whole area of the display panel, and a transparent electrode may be formed on the planarization layer 883.

A common electrode 891 and a pixel electrode 893 including a transparent conductive material such as indium tin oxide (ITO), indium zinc oxide (IZO), etc., are formed on the planarization layer 883.

The common electrode 891 and the pixel electrode 893 are substantially the same as the common electrode 791 and the pixel electrode 793 in FIG. 7 except for a separation distance d3 between the first electrode bars and a separation distance d4 between the second electrode bars. Thus, a detailed description thereof will be omitted.

The first electrode bars include a first sub-common electrode 891a and a first sub-pixel electrode 893a. The separation distance d3 between the first electrode bars in an area close to the first data line 771a and an area close to the second data line 771b is greater than in a center area between the first data line 771a and the second data line 771b.

The second electrode bars include a second sub-common electrode 891b and a second sub-pixel electrode 893b. The separation distance d4 between the second electrode bars in an area close to the first data line 771a and an area close to the second data line 771b is greater than in a center area between the first data line 771a and the second data line 771b.

The separation distances d3 between the first electrode bars are substantially non-uniform, and the separation distances d4 between the second electrode bars are also substantially non-uniform as illustrated in FIG. 11. However, an average of the separation distances d3 and an average of the separation distances d4 are substantially the same as the average of the separation distances d1 and the average of the separation distances d2, respectively. Thus, the average of the separation distances d3 is greater than the average of the separation distances d4 so that an electric field of the reflective area RA is about half of an electric field of the transmissive area TA.

An equivalent circuit diagram illustrating a pixel area shown in FIG. 11 is substantially the same as the equivalent circuit diagram in FIG. 9. Thus, a detailed description thereof will be omitted.

A flowchart illustrating a method of manufacturing the display substrate in FIG. 11 is substantially the same as the flowchart in FIG. 10 except for forming the planarization layer 883 instead of the color filter pattern 783 (step S115). Thus, a detailed description thereof will be omitted.

A block diagram illustrating a light route and schematic diagrams illustrating polarization states according to the present exemplary embodiment are substantially the same as the light route and the schematic diagrams in FIG. 5, FIG. 6A and FIG. 6B except that the display panel includes the display substrate 800 and the reflective layer 785 in FIG. 12 instead of the display substrate 100 in FIG. 2. Thus, identical reference numerals are used in FIG. 11 and FIG. 12 to refer to components that are the same or like those shown in FIG. 5, FIG. 6A and FIG. 6B, and a detailed description thereof will be omitted.

According to the present exemplary embodiment, the separation distances d3 and the separation distances d4 respectively included in the common electrode 891 and the pixel electrode 893 are not uniform. Thus, viewing angle of an LCD device is improved.

Figure 13:
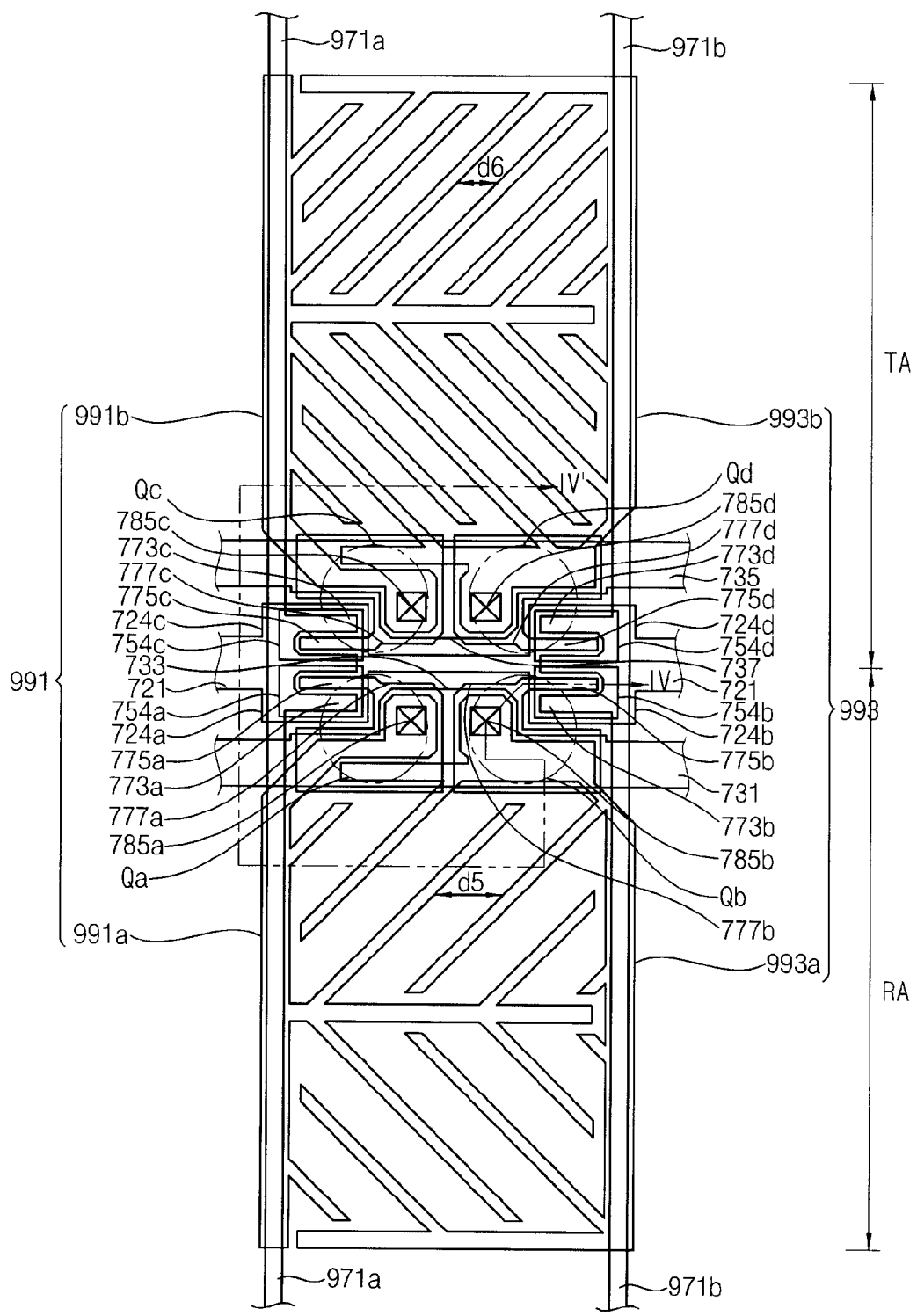
FIG. 13 is a plan view illustrating a display panel according to still another exemplary embodiment of the present invention.

FIG. 13 is a plan view illustrating a display panel according to still another exemplary embodiment of the present invention.

A cross-sectional view taken along line IV-IV' shown in FIG. 13 is substantially the same as the cross-sectional view in FIG. 8. Thus, a detailed description thereof will be omitted.

The display panel according to the present exemplary embodiment is the same as the display substrate 700 in FIG. 7 except for shapes of first and second electrode bars of the display substrate 900. Thus, a detailed description thereof will be omitted.

Referring to FIG. 8 and FIG. 13, the display panel according to the present exemplary embodiment includes the display substrate 900, the opposite substrate 201 and the liquid crystal layer 300. In this case, the opposite substrate 201 is substantially the same as the opposite substrate 201 in FIG. 8.

A common electrode 991 and a pixel electrode 993 including a transparent conductive material such as indium tin oxide (ITO), indium zinc oxide (IZO), etc., are formed on the color filter pattern 783.

The common electrode 991 receives a first voltage level from a first data line 971a, and the pixel electrode 993 receives a second voltage level from a second data line 971b.

The common electrode 991 includes a first sub-common electrode 991a corresponding to the reflective area RA and a second common electrode 991b corresponding to the transmissive area TA.

The pixel electrode 993 includes a first sub-pixel electrode 993a corresponding to the reflective area RA and a second pixel electrode 993b corresponding to the transmissive area TA.

The first sub-common electrode 991a and the first sub-pixel electrode 993a are alternately disposed, and the second sub-common electrode 991b and the second sub-pixel electrode 993b are alternately disposed.

In this case, the first sub-common electrode 991a and the corresponding first sub-pixel electrode 993a are defined as first electrode bars and the second sub-common electrode 991b and the corresponding second sub-pixel electrode 993b are defined as second electrode bars.

The first sub-common electrode 991a makes contact with the first contact electrode 777a and the first sub-pixel electrode 993a makes contact with the second contact electrode 777b.

The second sub-common electrode 991b makes contact with the third contact electrode 777c and the second sub-pixel electrode 993b makes contact with the fourth contact electrode 777d.

The outer shape of the pixel area P is rectangular.

The first sub-common electrode 991a and the second sub-common electrode 991b respectively include a first negative stem part and a second negative stem part overlapping the first data line 971a.

The first sub-common electrode 991a includes a first negative branching part extended horizontally from the center of the first negative stem part.

An upper portion of the first negative branching part is extended in a first diagonal direction and a lower portion of the first negative branching part is extended in a second diagonal direction.

The first diagonal direction may form an angle of about 45 degrees or about 225 degrees with respect to the gate line 721. The second diagonal direction may form an angle of about 135 degrees or about 315 degrees with respect to the gate line 721.

The second sub-common electrode 991b includes a second negative branching part extended horizontally from the center of the second negative stem part.

An upper portion of the second negative branching part is extended in the first diagonal direction and a lower portion of the second negative branching part is extended in the second diagonal direction.

The first sub-pixel electrode 993a and the second sub-pixel electrode 993b respectively include a first positive stem part and a second positive stem part overlapping the second data line 971b.

The first sub-pixel electrode 993a includes a first positive branching part extended horizontally from ends of the first positive stem part.

The first positive branching part of the first sub-pixel electrode 993a is extended in the first diagonal direction and the second diagonal direction to be disposed alternately with the first negative branching part.

The second sub-pixel electrode 993b includes a second positive branching part extended horizontally from ends of the second positive stem part.

The second positive branching part of the second sub-pixel electrode 993b is extended in the second diagonal direction and the first diagonal direction to be disposed alternately with the second negative branching part.

In this case, a sum of the size of the first negative branching part and the size of the first positive branching part is about half of a sum of the size of the second negative branching part and the size of the second positive branching part. In addition, an average of separation distances d5 between the first electrode bars and an average of separation distances d6 between the second electrode bars are substantially the same as the average of the separation distances d3 and the average of the separation distances d4, respectively. Thus, the average of the separation distances d5 is greater than the average of the separation distances d6 so that an electric field of the reflective area RA is about half of an electric field of the transmissive area TA.

An equivalent circuit diagram illustrating a pixel area shown in FIG. 13 is substantially the same as the equivalent circuit diagram in FIG. 9. Thus, a detailed description thereof will be omitted.

A flowchart illustrating a method of manufacturing the display substrate in FIG. 13 is substantially the same as the flowchart in FIG. 10. Thus, a detailed description thereof will be omitted.

A block diagram illustrating a light route and schematic diagrams illustrating polarization states according to the present exemplary embodiment are substantially the same as the light route and the schematic diagrams in FIG. 5, FIG. 6A and FIG. 6B except that the display panel includes the display substrate 900, the opposite substrate 201 and the reflective layer 785 in FIG. 13 instead of the display substrate 100, the opposite substrate 200 and the reflective layer 185 in FIG. 1. Thus, the same reference numerals are used for the same elements, and thus, a detailed description thereof will be omitted.

According to the present exemplary embodiment, the first electrode bars are formed in the first diagonal direction and the second diagonal direction and the second electrode bars are formed in the first diagonal direction and the second diagonal direction. Therefore, forming directions of the first electrode bars and the second electrode bars are various. Thus, viewing angle of an LCD device is improved.

Figure 14:
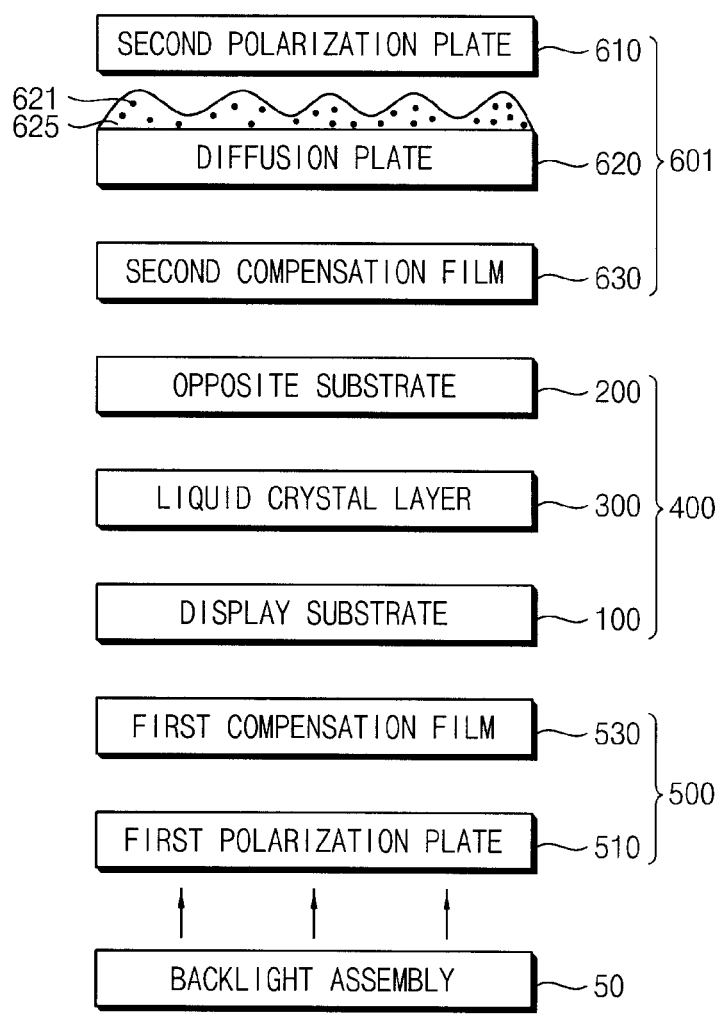
FIG. 14 is a cross-sectional view illustrating an LCD device according to still another exemplary embodiment of the present invention.

FIG. 14 is a cross-sectional view illustrating an LCD device according to still another exemplary embodiment of the present invention.

The LCD in FIG. 14 is substantially the same as the LCD in FIG. 5 except that an optical unit 601 further includes a diffusion plate 620 and except that an adhesive layer 625 is spread on the diffusion plate 620 instead of on the second polarization plate 610. Thus, a detailed description thereof will be omitted. In addition, a display panel 400 in FIG. 14 may include the display panels according to the previous exemplary embodiments.

Referring to FIG. 5 and FIG. 14, the LCD according to the present exemplary embodiment includes the display panel 400, the first optical unit 500, the second optical unit 601 and the backlight unit 50.

The second optical unit 601 includes a plurality of optical films. For example, the second optical unit 601 includes the second polarization plate 610, the diffusion plate 620 and the second compensation film 630. The second compensation film 630 is disposed over the display panel 400. The diffusion plate 620 is disposed over the second compensation film 630. The second polarization plate 610 is disposed over the diffusion plate 620. The adhesive layer 625 including scattering particles 621 is spread on the diffusion plate 620. The adhesive layer 625 may be spread under the diffusion plate 620 or on both surfaces of the diffusion plate 620. The adhesive layer 625 having an embossing pattern spread on the diffusion plate 620 is described. Alternatively, the adhesive layer 625 may be omitted and a surface including the scattering particles 621 may be embossed. In addition, according to the present exemplary embodiment, the diffusion plate 620 is disposed between the second compensation film 630 and the second polarization plate 610. Alternatively, the diffusion plate 620 may be disposed between the opposite substrate 200 and the second compensation film 630.

Schematic diagrams illustrating polarization states of light when the LCD of FIG. 14 is used are substantially the same as the schematic diagrams in FIG. 6A and FIG. 6B. Thus, a detailed description thereof will be omitted.

According to the present exemplary embodiment, the diffusion plate 620 including the adhesive layer 625 may prevent interference fringes having rainbow colors when the LCD device is driven. In addition, a haze value of the LCD device may be adjusted from about 5% to about 70% so that the LCD device is embodied to be appropriate for outdoor use.

According to some exemplary embodiments of the present invention, a separation distance between a common electrode and a pixel electrode in a reflective area is larger than that in a transmissive area. Therefore, cell gaps of a liquid crystal layer may be embodied freely so that a large-scaled display panel embodies a transflective-type LCD. Therefore, viewing angle may be improved and power consumption may be reduced.

Additionally, distances between the common electrode and the pixel electrode and shapes of the common electrode and the pixel electrode may be various so that viewing angle may be improved and power consumption may be reduced further.

The foregoing is illustrative of the present invention and is not to be construed as limiting thereof. Although a few exemplary embodiments of the present invention have been described, those skilled in the art will readily appreciate that various modifications and variations can be made in the present invention without departing from the spirit or scope of the invention. Thus, it is intended that the present invention cover the modifications and variations of this invention provided they come within the scope of the appended claims and their equivalents. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims.

What is claimed is:

1. A display substrate, comprising:
a base substrate comprising a pixel area comprising a transmissive area and a reflective area;
a reflective layer disposed in the reflective area of the base substrate;
a common electrode comprising a first sub-common electrode disposed in the reflective area and a second sub-common electrode disposed in the transmissive area;
a pixel electrode comprising a first sub-pixel electrode spaced apart from the first sub-common electrode by a first distance in the reflective area, and a second sub-pixel electrode spaced apart from the second sub-common electrode by a second distance in the transmissive area, wherein the second distance is less than the first distance; and
switching elements disposed at the center of the pixel area and respectively electrically connected to the common electrode and the pixel electrode.

2. The display substrate of claim 1, wherein the first sub-common electrode comprises a plurality of first sub-common electrodes, and the first sub-pixel electrode comprises a plurality of first sub-pixel electrodes each spaced apart from corresponding first sub-common electrodes disposed in the reflective area, and
the second sub-common electrode comprises a plurality of second sub-common electrodes, and the second sub-pixel electrode comprises a plurality of second sub-pixel electrodes spaced apart from corresponding second sub-common electrodes disposed in the transmissive area.

3. The display substrate of claim 2, wherein a separation distance between at least one of the first sub-common electrodes and the corresponding first sub-pixel electrode is different from a separation distance between another of the first sub-common electrodes and the corresponding first sub-pixel electrode, and
a separation distance between at least one of the second sub-common electrodes and the corresponding second sub-pixel electrode is different from a separation distance between another of the second sub-common electrodes and the corresponding second sub-pixel electrode.

4. The display substrate of claim 2, wherein separation distances between the first sub-common electrodes and the corresponding first sub-pixel electrodes are substantially equal to each other, and
separation distances between the second sub-common electrodes and the corresponding second sub-pixel electrodes are substantially equal to each other.

5. The display substrate of claim 2, wherein an average of the separation distances between the first sub-common electrodes and the corresponding first sub-pixel electrodes in the reflective area is greater than an average of the separation distances between the second sub-common electrodes and the corresponding second sub-pixel electrodes in the transmissive area.

6. The display substrate of claim 1, further comprising a first data line and a second data line that are disposed on the base substrate to receive different voltages, and
wherein the first sub-common electrode and the second sub-common electrode are electrically connected to the first data line, and the first sub-pixel electrode and the second sub-pixel electrode are electrically connected to the second data line.

7. The display substrate of claim 1, further comprising an insulation layer disposed on the base substrate, the insulation layer comprising an embossing pattern in the reflective area, wherein
the common electrode and the pixel electrode are disposed on the insulation layer,
the common electrode comprises a transparent conductive material,
the pixel electrode comprises a transparent conductive material, and
the reflective layer is disposed on the embossing pattern.

8. The display substrate of claim 7, wherein the embossing pattern comprises a random convex pattern and a random concave pattern.

9. The display substrate of claim 7, wherein the switching elements comprise:
a first switching element formed in the center of the pixel area and electrically connected to the first sub-common electrode;
a second switching element formed in the center of the pixel area and electrically connected to the first sub-pixel electrode;
a third switching element formed in the center of the pixel area and electrically connected to the second sub-common electrode; and
a fourth switching element formed in the center of the pixel area and electrically connected to the second sub-pixel electrode.

10. The display substrate of claim 9, wherein a separation distance between the first sub-common electrode and the first sub-pixel electrode disposed in a first area of the reflective area is less than a separation distance between the second sub-common electrode and the second sub-pixel electrode in a second area of the transmissive area,
a separation distance between the first sub-common electrode and the first sub-pixel electrode disposed in a third area of the reflective area is less than the separation distance between the second sub-common electrode and the second sub-pixel electrode in a fourth area of the transmissive area, and
the first area and the second area are symmetrical with respect to a center line of the pixel area, and the third area and the fourth area are symmetrical with respect to the center line of the pixel area.

11. The display substrate of claim 1, wherein the switching elements are disposed:
between the first sub-common electrode and the second sub-common electrode;
between the first sub-pixel electrode and the second sub-pixel electrode; or
between the first sub-common electrode and the second sub-common electrode and between the first sub-pixel electrode and the second sub-pixel electrode.

12. A method of manufacturing a display substrate, the method comprising:
forming a reflective layer on a base substrate comprising a pixel area comprising a transmissive area and a reflective area, the reflective layer formed in the reflective area;
forming a first sub-pixel electrode in the reflective area, and a second sub-pixel electrode in the transmissive area;
forming a first sub-common electrode spaced apart from the first sub-pixel electrode by a first distance in the reflective area, and a second sub-common electrode spaced apart from the second sub-pixel electrode by a second distance in the transmissive area, the second distance being less than the first distance; and forming switching elements at the center of the pixel area, the switching elements being electrically connected to respective ones of the first sub-pixel electrode, the second sub-pixel electrode, the first sub-common electrode, and the second sub-common electrode.

13. The method of claim 12, wherein the first sub-pixel electrode, the second sub-pixel electrode, the first sub-common electrode and the second sub-common electrode are simultaneously patterned using one mask.

14. The method of claim 12, further comprising forming an insulation layer on the base substrate, the insulation layer comprising an embossing pattern in the reflective area,
wherein the reflective layer is disposed on the embossing pattern.

15. The method of claim 14, further comprising forming a color filter pattern on the base substrate including the reflective layer,
wherein a thickness of the insulation layer in the reflective area is greater than that of the insulation layer in the transmissive area, and a thickness of the color filter pattern in the reflective area is less than that of the color filter pattern in the transmissive area.

16. A liquid crystal display (LCD) device, comprising:
a display substrate comprising a base substrate comprising a pixel area comprising a transmissive area and a reflective area, a reflective layer disposed in the reflective area, a common electrode comprising a first sub-common electrode disposed in the reflective area and a second sub-common electrode disposed in the transmissive area, and a pixel electrode comprising a first sub-pixel electrode spaced apart from the first sub-common electrode by a first distance in the reflective area and a second sub-pixel electrode spaced apart from the second sub-common electrode by a second distance in the transmissive area, the second distance being less than the first distance;
an opposite substrate facing the display substrate;
a liquid crystal layer disposed between the opposite substrate and the display substrate; and
switching elements disposed at the center of the pixel region and electrically connected to respective ones of the first sub-pixel electrode, the second sub-pixel electrode, the first sub-common electrode, and the second sub-common electrode.

17. The LCD device of claim 16, wherein a cell gap of the liquid crystal layer corresponding to the transmissive area is substantially equal to that of the liquid crystal layer corresponding to the reflective area.

18. The LCD device of claim 16, further comprising:
a first polarization plate disposed under the display substrate; and
a second polarization plate disposed over the opposite substrate, the second polarization plate having an adhesive layer including scattering particles spread thereon.

19. The LCD device of claim 16, further comprising:
a first polarization plate disposed under the display substrate;
a diffusion plate disposed over the opposite substrate and comprising scattering particles; and
a second polarization plate disposed over the diffusion plate.

20. The LCD device of claim 16, wherein the switching elements are disposed:
between the first sub-common electrode and the second sub-common electrode;
between the first sub-pixel electrode and the second sub-pixel electrode; or
between the first sub-common electrode and the second sub-common electrode and between the first sub-pixel electrode and the second sub-pixel electrode.

* * * * *